3,423,396
METHOD OF MAKING AGAROSE
Burton A. Zabin, Berkeley, Calif., assignor to Bio-Rad Laboratories, Richmond, Calif.
No Drawing. Filed Oct. 26, 1966, Ser. No. 589,505
U.S. Cl. 260—209                         16 Claims
Int. Cl. C08b 25/00

ABSTRACT OF THE DISCLOSURE

Method for obtaining agarose separated from agaropectin by passing an agar solution through a hydrophilic loose lattice anion exchanger such as an organic modified cellulose like diethylaminoethyl cellulose, the ion exchanger being characterized by pores large enough to admit molecules having a molecular weight of 25,000 and above, the eluate obtained from the ion exchanger comprising agarose substantially free from agaropectin.

---

This invention relates to agarose. More particularly, it relates to an improved method for separating agarose from agar free from the agaropectin component of the agar.

It has been shown that agar consists of two fractions. One fraction is a neutral galactose polymer called agarose; the other fraction is known as agaropectin and is an ionic material containing sulfate and carboxyl groups. Agarose, primarily because of its nonionic character, offers advantages for many uses over agar which exhibits ionic properties due to its agaropectin component. For example, some recent work has shown agarose to be useful for electrophoresis, gel diffusion, and in chromatography.

A number of methods for preparing agarose by separating it from agar have been developed. These techniques include the acetylation method of C. Araki, J. Chem. Soc. Japan, Pure Chem. Sect., 58, 1338 (1937); the cetylpyridinium chloride method of S. Hjerten, Biochim. Biophys. Acta, 53, 514 (1961); and the method of B. Russell, T. H. Mead and A. Polson, Biochim. Biophys. Acta, 86, 169 (1964), utilizing fractional precipitation with polyethylene glycol. While all of these methods achieve their goal reasonably well, they are all time consuming and in some cases require expensive reagents. In the Russell, et al. method, it is sometimes necessary to employ different conditions for various batches of the raw agar material which is a serious drawback to its adaptation to a large scale manufacturing endeavor.

The present method represents a dramatic improvement over the prior art techniques for preparing agarose. The method is simple, fast, and economical in the extreme by comparison with that which has come before. Most important, the end agarose product of this invention is of the highest quality, is substantially free from low molecular weight acidic impurities, and is otherwise at least as good as the materials prepared by other methods.

In essence, the invention contemplates contacting a solution of agar with an anionic ion exchanger. Through the usual mechanism of ion exchange the ionic agaropectin component is retained in the lattice of the ion exchanger. The eluent from the ion exchanger comprises agarose substantially free from agaropectin. The key to the success of the method lies in the selection of an anionic ion exchanger having pores in the lattice sufficiently large to admit the relatively large agar molecules. It has been shown experimentally that where the ion exchanger is selected so that it will admit molecules having molecular weights of about 25,000 or above, the lattice structure is appropriate for use in the present invention. If ion exchangers are used having substantially smaller pore sizes than this, access to the ion exchange sites in the exchanger will be blocked and the desired ion exchange cannot occur.

With this one important limitation of lattice size, no other critical limitations are involved. The method is thus of the utmost simplicity and by its nature capable of rapid, economical operation without the requirement of expensive reagents. The ion exchange media in itself does not represent a serious cost factor since it can be regenerated with a base such as sodium hydroxide and an acid such as citric acid (to provide a media in salt form), for example, at suitable intervals so that the exchanger can be reused.

In the preferred embodiment, raw agar is made up in an aqueous solution for passage through the ion exchanger, although it is possible to utilize other solvents. Conveniently, a solution of a concentration of about 1–5% by weight of agar is employed although concentrations up to 12–15% could be utilized. Dissolving of the agar is facilitated by heating preferably close to the boiling point. If advantageous, pressure and other techniques could be used to further facilitate the solution of the agar and to obtain higher concentrations thereof. A 2% aqueous agar solution has been found to be convenient for many purposes due to the viscosity of the solution and the fact that the solution is easily obtained simply by the use of heat.

Any anionic ion exchanger having the requisite pore size can be used. Excellent results have been obtained with the polyethylaminoethyl celluloses including diethylaminothyl cellulose and triethylaminoethyl cellulose. Other organic modified celluloses of the noted pore size are contemplated. In general, hydrophyllic, loose lattice materials suitable for use with aqueous agar solutions are suited to the process. Macroreticular resins fall in this category. Among the usable resin materials should be mentioned the well-known polyacrylamides and dextrans, in addition to the cellulose based materials described above.

For optimum results, the anion exchanger should be in the salt form. Salts of weak acids such as acetate or citrate are preferable, since these forms of the cellulose exchangers have the greatest affinity for the agaropectin. In practice, citrate is used since it helps buffer the solution at a pH least likely to cause dissociation of the agarose polymer.

In executing the process, it is only a matter of passing the agar solution through the ion exchanger on a continuous basis or alternately to allow contact in batch fashion. To retain the agar in solution it is convenient to perform this operation while the solution is hot. Due to the viscous nature of the agar solution, it may be helpful to force the agar solution through the exchanger under pressure as by applying a source of compressed air to a column containing the exchanger through which the agar solution is passed.

During the pass through the exchanger the ionic agaropectin component is retained by the exchanger. The eluent can be treated in any suitable manner to recover agarose in the desired form. One feasible technique found to be most suited to the present materials includes freezing the eluent to separate the agarose and water from ionic impurities, such as salts. The two-phase system attained from the freezing permits an easy separation. If the frozen mass is then thawed, the agarose can be separated from the water or other solvent by a suitable technique, such as filtration.

Another way to recover agarose from the eluent is to grind the agarose gel and then wash it with alcohol so that the alcohol replaces the aqueous phase of the gel. The gel can then be dried to powder form.

The following example will illustrate the invention more specifically. 20 g. of agar were dissolved in 1 liter of near boiling distilled water to form a 2% agar solution. 80 g. of diethylaminoethyl cellulose (0.86 meq./g. capacity) in the citrate form were then added and the temperature was maintained at 80° C. for one hour. The slurry was stirred periodically. The agarose solution was then separated from the cellulose by filtration and allowed to gel by cooling to room temperature. The gel was then ground to 8 mesh particles and washed with three bed volumes of alcohol in a column. The granules were then dried in an oven at 50° C. for 16 hours, resulting in a yield of 12 grams of white agarose powder. Microanalysis of the product indicated a sulfur content of 0.1% by weight.

The above product compares favorably with results reported in the literature using prior art methods. With respect to the ease, speed and cost of the process, there is of course a decided difference in favor of the present technique.

The diethylaminoethyl cellulose used in the above procedure can be regenerated using any suitable procedure, such as first washing with two bed volumes of 2 M NaCl at 90° C. followed by one bed volume of distilled water at room temperature. Then two bed volumes of 0.5 M NaOH is added followed by one bed volume of distilled water. Finally, two bed volumes of 0.5 M citric acid is added, followed by distilled water until the eluent is neutral.

The source of the cellulose exchanger does not substantially affect the inventive concept. Further, any of the different types of resins described earlier could be substituted for the exchanger of the example, with similar results being obtained.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An improved method for preparing agarose comprising: forming a solution of agar, and contacting said solution with an anionic ion exchanger whose pores are large enough to admit molecules having a molecular weight of about 25,000 and above, the agaropectin content of the agar being retained by the anionic ion exchanger so that the agarose component may be recovered from the solution.

2. A method in accordance with claim 1 wherein said solution of agar is an aqueous solution having an agar concentration of about 1–15% by weight.

3. A method in accordance with claim 1 wherein said ion exchanger is a polyethylaminoethyl cellulose.

4. A method in accordance with claim 3 wherein the ion exchanger is selected from the group consisting of diethylaminoethyl cellulose and triethylaminoethyl cellulose.

5. A method in accordance with claim 1 wherein the contact of said solution with said ion exchanger is executed on a batch basis.

6. A method in accordance with claim 1 wherein the contact of said agar solution with said ion exchanger is executed on a continuous basis by flowing the agar solution through the ion exchanger.

7. A method in accordance with claim 1 wherein the agar solution is prepared by solubilizing agar in water by applying heat thereto.

8. A method in accordance with claim 7 wherein th hot aqueous solution of agar has a concentration of abou. 1–5% by weight of agar.

9. A method in accordance with claim 1 wherein the ion exchanger is a hydrophyllic loose lattice anionic ion exchanger selected from the group consisting of polyacrylamides, dextrans, macroreticular resins, and organic modified celluloses.

10. A method in accordance with claim 1 wherein said an ionic ion exchanger is in salt form preparatory to contact with said agar solution.

11. A method in accordance with claim 1, including the step of separating the eluent following contact with said anionic ion exchanger and recovering purified agarose therefrom.

12. A method in accordance with claim 11 wherein the agarose is recovered by freezing the eluent, separating the frozen portion, thawing the frozen portion, and recovering purified agarose from the frozen portion.

13. A method in accordance with claim 12 wherein purified agarose is recovered from said thawed frozen portion by filtration to separate water from the agarose.

14. A method in accordance with claim 11 wherein agarose is recovered from the eluent by cooling the eluent as required to gel the agarose, grinding the agarose gel, washing the ground material with alcohol to replace the aqueous phase, and then removing the alcohol to produce a dry particulate solid.

15. A method in accordance with claim 12 wherein the aqueous phase of the thawed frozen portion is removed to provide a dry particulate product.

16. A method in accordance with claim 6 wherein the agar solution is heated and flowed through said ion exchanger by application of pressure.

References Cited

UNITED STATES PATENTS

| | | | |
|---|---|---|---|
| 2,323,483 | 7/1943 | Myers et al. | 260—209.5 |
| 2,694,057 | 11/1954 | Adams | 260—209 |
| 2,813,810 | 11/1957 | Smith et al. | 260—209 |
| 2,901,398 | 8/1959 | Perlman | 260—209 |
| 3,281,409 | 10/1966 | Blethen | 260—209 |

LEWIS GOTTS, *Primary Examiner.*

JOHNNIE R. BROWN, *Assistant Examiner.*

U.S. Cl. X.R.

260—209.5